United States Patent
Lee

(10) Patent No.: US 7,913,789 B2
(45) Date of Patent: Mar. 29, 2011

(54) REINFORCED UPPER FRAME FOR SUPPORTING CABIN OF HEAVY CONSTRUCTION EQUIPMENT USING WELDING DEFORMATION PREVENTING STRUCTURE, AND METHOD OF MANUFACTURING THE SAME

(75) Inventor: Jin Woo Lee, Kimhae (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 1308 days.

(21) Appl. No.: 11/478,227

(22) Filed: Jun. 29, 2006

(65) Prior Publication Data
US 2007/0018555 A1 Jan. 25, 2007

(30) Foreign Application Priority Data
Jul. 25, 2005 (KR) .................. 10-2005-0067288

(51) Int. Cl.
*E02F 9/16* (2006.01)
(52) U.S. Cl. ................ 180/89.12; 280/781; 296/190.03; 296/190.04; 296/204
(58) Field of Classification Search .............. 280/781; 296/190.03, 190.04, 190.08, 203.01, 204, 296/193.07; 180/89.1, 89.12, 89.13; *E02F 9/08, E02F 9/16*
See application file for complete search history.

(56) References Cited

U.S. PATENT DOCUMENTS
4,061,392 A 12/1977 Lowder et al.

FOREIGN PATENT DOCUMENTS
| JP | 7-150589 A | * | 6/1995 |
| JP | 2001-323511 A | * | 11/2001 |
| JP | 2003-82705 A | * | 3/2003 |
| WO | 01/32476 | | 5/2001 |

* cited by examiner

*Primary Examiner* — Ruth Ilan
(74) *Attorney, Agent, or Firm* — Ladas & Parry LLP

(57) ABSTRACT

A reinforced upper frame for supporting a cabin of heavy construction equipment using a welding deformation preventing structure and a method of manufacturing the same are disclosed, in which even if a side frame is welded to a machined center frame, there is no thermal deformation around the machined portion. The reinforced upper frame includes a center frame having a lower plate machined to accommodate a swing ring gear, a lateral plate machined to accommodate an operation device, and a welding deformation preventing structure fixed to one side of the lower plate and lateral plate prior to welding, in which a part of the cabin is mounted on the welding deformation preventing structure, and left and right frames each having a side channel disposed in a longitudinal direction of the center frame and a side frame welded to the structure for connecting the side channel and the center frame.

5 Claims, 5 Drawing Sheets

REINFORCED UPPER FRAME FOR SUPPORTING CABIN OF HEAVY CONSTRUCTION EQUIPMENT USING WELDING DEFORMATION PREVENTING STRUCTURE, AND METHOD OF MANUFACTURING THE SAME

CROSS-REFERENCE TO RELATED APPLICATION

This application is based on and claims priority from Korean Patent Application No. 10-2005-67288, filed on Jul. 25, 2005, the disclosure of which is incorporated herein in its entirety by reference.

BACKGROUND OF THE INVENTION

1. Field of the Invention

The present invention relates to a reinforced upper frame for supporting a cabin of heavy construction equipment using a welding deformation preventing structure and a method of manufacturing the same, and more particularly, to an upper frame of heavy construction equipment capable of preventing structural deformation of a machined center frame when a side frame is welded or fixed to the center frame.

2. Description of the Prior Art

FIG. 1 is a cross-sectional view illustrating the construction of a cabin mounted on a conventional upper frame, and FIG. 2 is a perspective view illustrating the construction of a conventional upper frame.

Referring to FIG. 1, heavy construction equipment, such as an excavator, generally includes an upper frame 2 that can be rotated above and is mounted on a lower driving structure (not shown), a cabin 4 mounted on the upper frame 2, and vibration absorption devices 8 and 10, installed between the upper frame 2 and the base plate of the cabin 4, for resiliently supporting the cabin 4 with respect to the upper frame 2 and connecting the base plate to the upper frame 2, with the base plate being spaced apart from the upper frame 2 at a constant interval.

Referring to FIG. 2, the upper frame 2 has a center frame 20, on which an operation device is mounted, and left and right frames 30 and 40 each mounted on left and right sides of the center frames 20. The center frame 20 has lower plates 22, on which a swing ring gear is mounted, and lateral plates 24 vertically mounted on the lower plates 22 and connected to the operation device. The left and right frames 30 and 40 have a side channel 32 extended in a longitudinal direction and a plurality of side frames 34 connecting the center frame 20 with the side channel 32.

The vibration absorption devices 8 and 10 that support the cabin 4 and absorb the shock applied from the exterior are mounted only on the left frame 30; therefore, only the left frame 30 is provided with a plurality of through-holes 36 through which the vibration absorption devices 8 and 10 are mounted. Here, the side frame 34 mounted on the left frame 30 will now be described.

In order to connect the left frame 30 to the center frame 20, the left frame 30 is simultaneously welded to the lower plate 22 and the lateral plate 24 of the center frame 20. That is, in order to obtain welding strength, each end of a plurality of the side frames 34 is welded to the lower plate 22 of the center frame 20, on which the swing ring gear is mounted, and the lateral plate 24 of the center frame 20, on which the operation device is mounted.

If the left frame 30 is directly welded to the lower plate 22 of the center frame 20, on which the swing ring gear is mounted, the portion, in which the swing ring gear is fastened to the lower plate 22, is subjected to thermal deformation due to welding. Consequently, flatness of the lower plate 22 closely fastened to the swing ring gear is adversely affected, which may shorten a life span of the swing ring gear. Furthermore, another problem is that the vertical rocking of an upper swing structure causes the precision of the operation to deteriorate.

The contact portion A between the lower plate 22 of the center frame 20 and the side frame 34 of the left frame 30 is not welded to avoid thermal deformation that results from welding; but only the contact portion B between the lateral plate 24 of the center frame 20 and the side frame 34 of the left frame 30 is welded.

When the heavy construction equipment rolls over or is applied with excessive shock from the exterior, the stress is concentrated upon the welded portion, i.e., the vertical contact portion between the lateral plate 24 of the center frame 20 and the side frame 34 since the horizontal contact portion between the lower plate 22 of the center frame 20 and the side frame 34 is not welded, and thus the welded portion is easily broken, e.g., by creation of cracks. Therefore, its strength and durability are limited.

SUMMARY OF THE INVENTION

Accordingly, the present invention has been made to solve the above-mentioned problems occurring in the prior art; one object of the present invention is to provide a reinforced upper frame for supporting a cabin of heavy construction equipment using a welding deformation preventing structure and a method of manufacturing the same, in which even if a side frame is welded to a machined center frame, there is no thermal deformation around the machined portion.

In order to accomplish this object, a reinforced upper frame is provided to support a cabin, an operation device, a fuel tank, and other devices of heavy construction equipment, in accordance to the present invention. The present invention includes a center frame having a lower plate machined to accommodate a swing ring gear, a lateral plate machined to accommodate an operation device, and a welding deformation preventing structure fixed to one side of the lower plate and lateral plate prior to machining, in which a part of the cabin is mounted on the welding deformation preventing structure; and the left and right frames each have a side channel disposed in a longitudinal direction of the center frame and a side frame welded to the structure for connecting the side channel and the center frame.

The welding deformation preventing structure may be welded to the lower plate and the lateral plate along a line or surface contact.

The welding deformation preventing structure may have a through-hole for accommodating a vibration absorption device to support the cabin.

The welding deformation preventing structure may be in the form of an open box, or in the form of a closed box.

According to another aspect of the present invention, there is provided a method of manufacturing an upper frame for supporting a cabin, an operation device, a fuel tank, and other devices of heavy construction equipment, including welding a welding deformation preventing structure to one side of a center frame to which a lower plate and a lateral plate are assembled; after welding of the welding deformation preventing structure, machining bolt holes for accommodating a swing ring gear in the lower plate of the center frame and machining holes for accommodating the operation device in the lateral plate of the center frame; and after machining, aligning left and right frames each having a side channel and a side frame with respect to left and right sides of the center frame, facing the welding deformation preventing structure to the side frame, and welding an entire contact portion between the side frame and the structure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art to gain a comprehensive understanding of the invention, and thus the present invention is not limited thereto.

The construction and operation of an upper frame of heavy construction equipment provided with a welding deformation preventing structure according to an embodiment of the present invention will now be described in detail with reference to a preferred embodiment.

Figure 1:
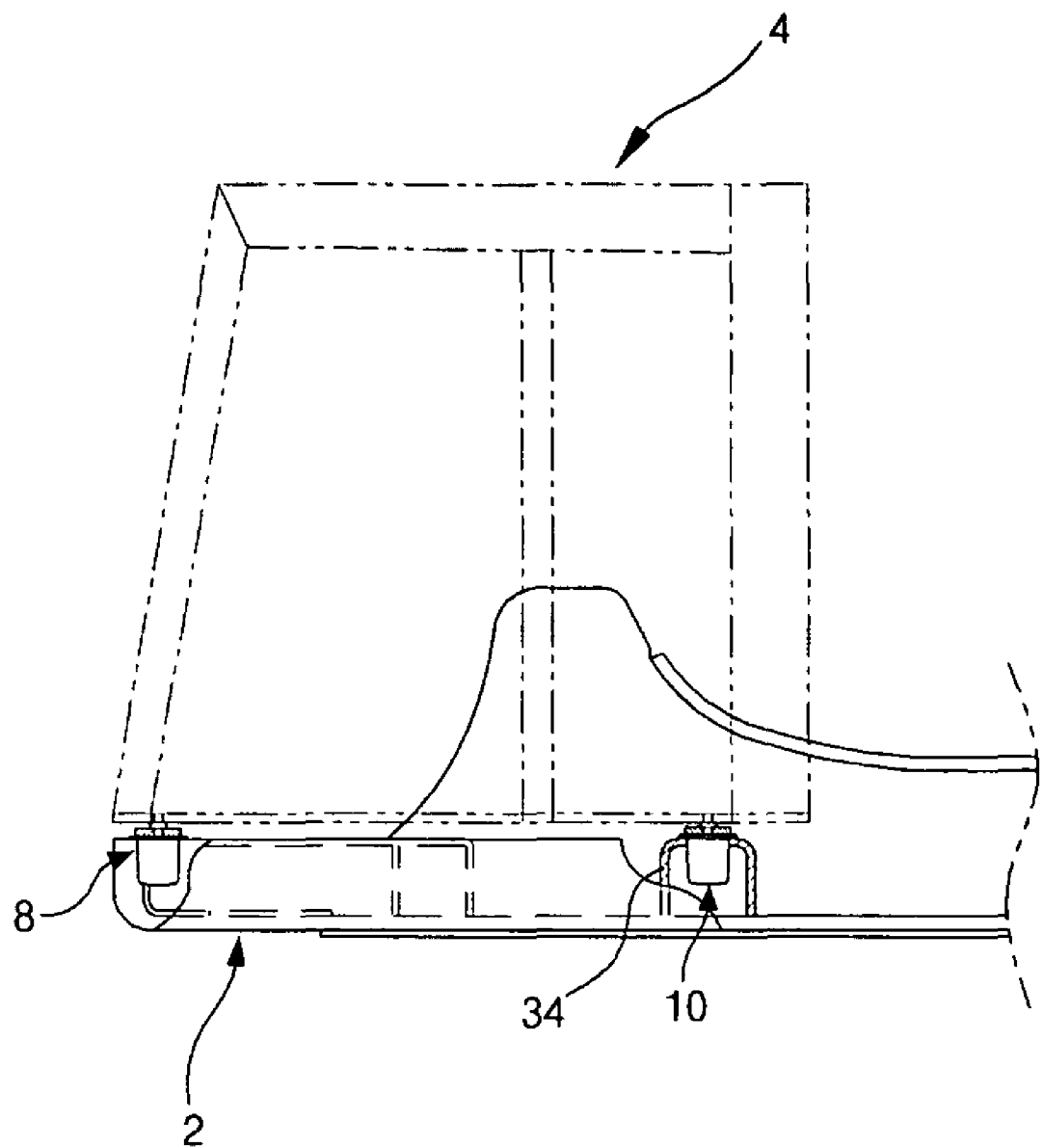
FIG. 1 is a cross-sectional view illustrating the construction of a cabin mounted on a conventional upper frame.
Figure 2:
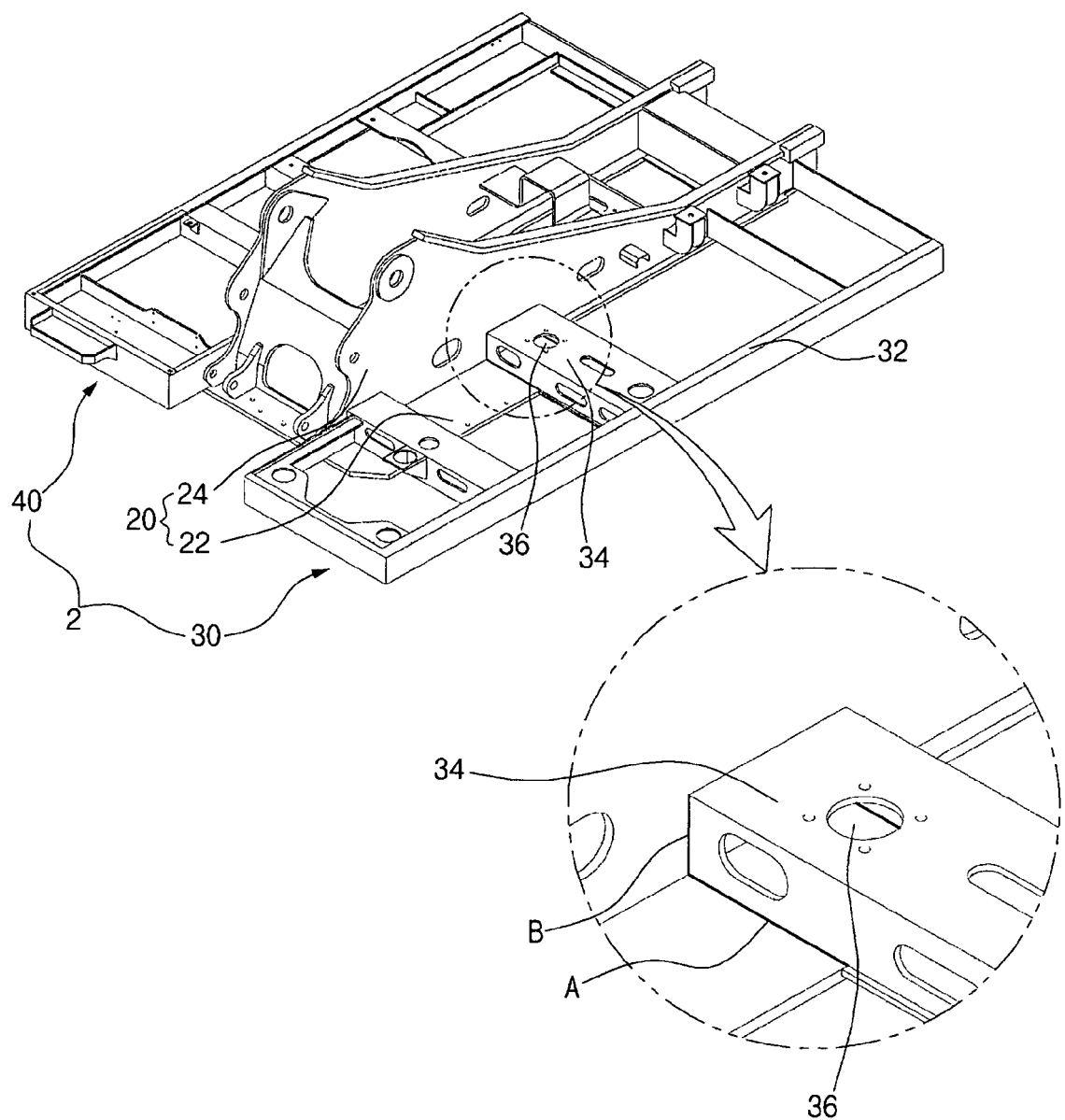
FIG. 2 is a perspective view illustrating the construction of a conventional upper frame.
Figure 3:
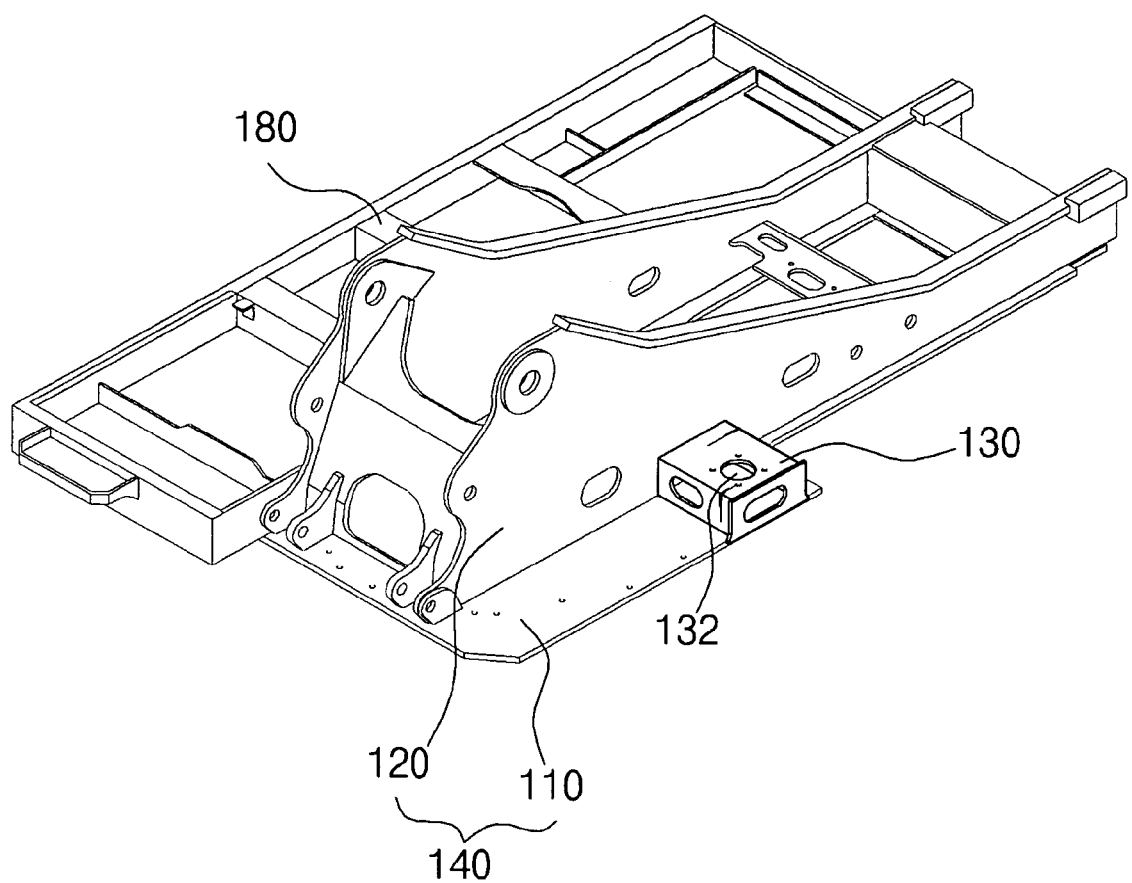
FIG. 3 is a perspective view illustrating the construction of the upper frame, on which a box-shaped welding deformation preventing structure has a through-hole, through which a cabin is mounted, according to a preferred embodiment of the present invention.
Figure 4:
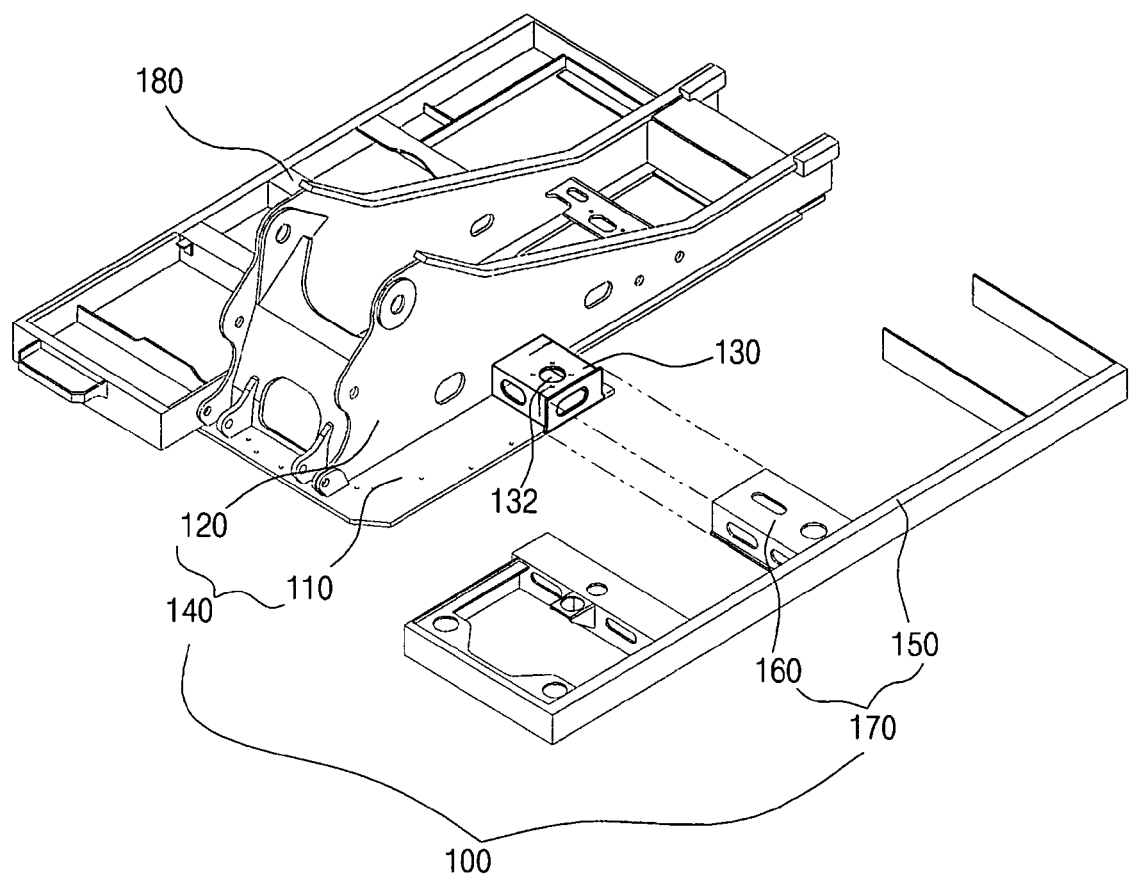
FIG. 4 is a perspective view illustrating the construction of an upper frame, before a side frame is welded to the welding deformation preventing structure according to an embodiment of the present invention.
Figure 5:
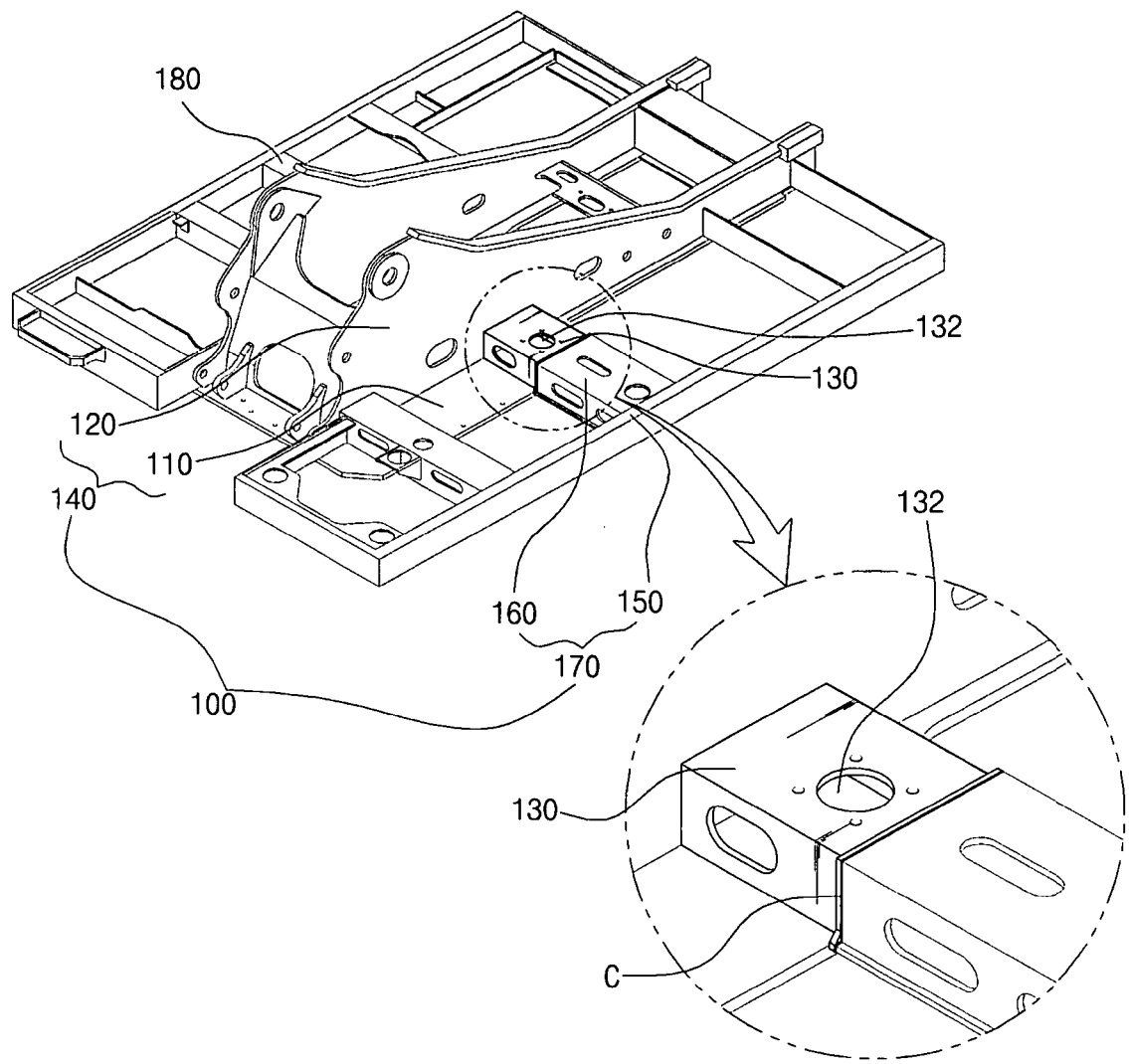
FIG. 5 is a perspective view illustrating the construction of an upper frame, after a side frame is welded to a welding deformation preventing structure according to an embodiment of the present invention.

FIG. 3 is a perspective view illustrating the construction of the upper frame provided with the box-shaped welding deformation preventing structure according to a preferred embodiment of the present invention, and FIGS. 4 and 5 are perspective views illustrating the construction of the upper frame before and after a side frame is welded to the welding deformation preventing structure according to an embodiment of the present invention.

As shown in FIG. 3, the upper frame 100 of the present invention includes a center frame 140 that has a lower plate 110 machined or adapted to accommodate a swing ring gear, a lateral plate 120 machined or adapted to accommodate an operation device (not shown), and a welding deformation preventing structure 130 previously fixed rigidly to one side of the lower plate 110 and lateral plate 120 by, for example, welding, in which a part of a cabin (not shown) is mounted on the welding deformation preventing structure, and left and right frames 170 and 180 each having a side channel 150 disposed in a longitudinal direction of the center frame 140 and a side frame 160 welded to the welding deformation preventing structure 130 for connecting the side channel 150 to the center frame 140.

Referring to FIG. 3, the center frame 140 of the present invention is utilized as the concept of comprising the welding deformation preventing structure 130 rigidly fixed to one side of the lower plate 110 and lateral plate 120 by welding before the center frame 140 is machined to accommodate the swing ring gear and the operation device.

The welding deformation preventing structure 130 is in the form of a box to enlarge the line contact portion between the lower plate 110 and the side plate 120, but it is not limited to the rectangular form. If the welding deformation preventing structure 130 is supported by and connected to the lower plate and the lateral plate 120, welding or other method may be employed. In this embodiment, the welding deformation preventing structure 130 is in the form of a box, and is welded to the contact portion between the lower plate 110 and the lateral plate 120.

Because the welding deformation preventing structure 130 is rigidly fixed to the lower plate 110 and the lateral plate 120 before the center frame 140 is machined to accommodate the swing ring gear and the operation device, the flatness of the lower plate 110 and lateral plate 120 is maintained through the subsequent machining, even though the lower plate 110 and the lateral plate 120 are thermally deformed by welding.

After the center frame 140 has been completed, one side of the side frame 160 is positioned to face the welding deformation preventing structure 130, and when the entire cross-sectional border C of the side frame 160 where the side frame 160 contacts the structure 130, is welded, the welding deformation is primarily prevented by the reinforcing effect of the welding deformation preventing structure 130 itself, and the welding deformation is secondarily prevented since the welding heat is discharged in parallel with the side frame 160.

The process of assembling the upper frame 100 with the welding deformation preventing structure 130 according to the preferred embodiment of the present invention will now be described in detail with reference to FIGS. 4 and 5.

First, the box-shaped welding deformation preventing structure 130, with the through-hole 132 for accommodating the cabin, is fixed to one side of the center frame 140, in which the lateral plate 120 is vertically assembled to the lower plate 110 by, for example, welding. More specifically, the closed/open box-shaped welding deformation preventing structure 130 is in close contact with the lower plate 110 and lateral plate 120 of the center frame 140, and the entire line or surface contact portion thereof is attached to each other by, for example, welding.

If the welding deformation preventing structure 130 has been completely welded, the lower plate 110 is machined to form bolt holes therein for mounting the swing ring gear, and the lateral plate 120 is machined to form holes therein for mounting the operation device.

After the machining has been completed, the left and right frames 170 and 180, each having the side channel 150 and the side frame 160, are aligned with respect to the left and right sides of the center frames 140, respectively, and the contact portion between the welding deformation preventing structure 130 and the side frame 160 is welded. Since the welding deformation preventing structure 130 is in the form of a box, and the side frame 160 is also in the form of an open/closed angular post, the entire cross-sectional border C of the contact portion between the side frame 160 and the welding deformation preventing structure 130 has to be welded.

According to the present invention, the welding deformation preventing structure 130 is rigidly fixed to the lower plate 110 and the lateral plate 120 by, for example, welding, before the center frame 140 is machined to accommodate the swing ring gear and the operation device. Even if the welding deformation preventing structure 130 is welded to the side frame 160, the welding deformation is primarily prevented by the reinforcing effect of the welding deformation preventing structure 130, and is secondarily prevented since the welding heat is discharged in parallel with the side frame 160.

With the above description, according to the construction of the present invention, since the welding deformation preventing structure is fixed to the center frame by, for example, welding, prior to the machining, there is no thermal deformation around the machined surface. Even if entire line/surface contact portion between the welding deformation preventing structure and the side frame is welded, the welding heat is shielded by the reinforcing effect of the welding deformation preventing structure, and also is transferred outward from the side frame, so that there is no welding deformation around the machined surface.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A reinforced upper frame for supporting a cabin, an operation device, a fuel tank, and other devices of heavy construction equipment, the upper frame comprising:
   a center frame having a lower plate machined to accommodate a swing ring gear, a lateral plate machined to accommodate an operation device, and a welding deformation preventing structure fixed to one side of the lower plate and lateral plate prior to machining, in which a part of the cabin is mounted on the welding deformation preventing structure; and
   a left frame having a side channel disposed in a longitudinal direction of the center frame and a side frame welded to the structure for connecting the side channel and the center frame.

2. The reinforced upper frame as claimed in claim 1, wherein the welding deformation preventing structure is welded to the lower plate and the lateral plate along a line or surface contact.

3. The reinforced upper frame as claimed in claim 1, wherein the welding deformation preventing structure has a through-hole for accommodating a vibration absorption device to support the cabin.

4. The reinforced upper frame as claimed in claim 1, wherein the welding deformation preventing structure is in the form of an open box.

5. The reinforced upper frame as claimed in claim 1, wherein the welding deformation preventing structure is in the form of a closed box.

\* \* \* \* \*